Oct. 21, 1930.   C. W. BRACKETT   1,778,996
SAW HOLDER
Filed Dec. 31, 1929
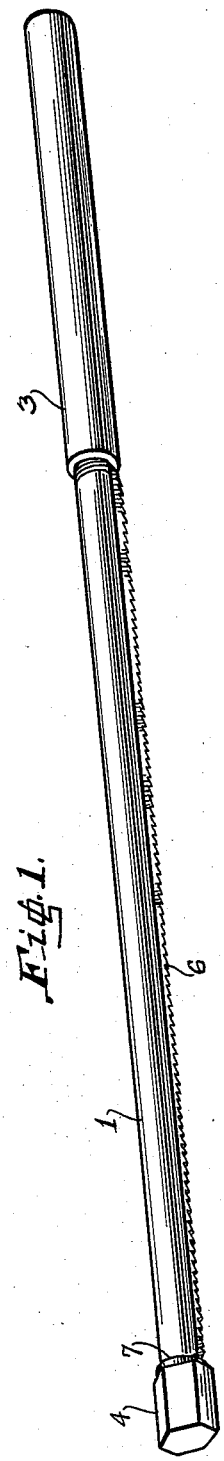
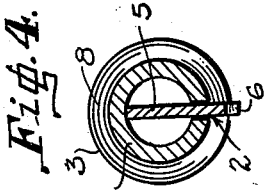
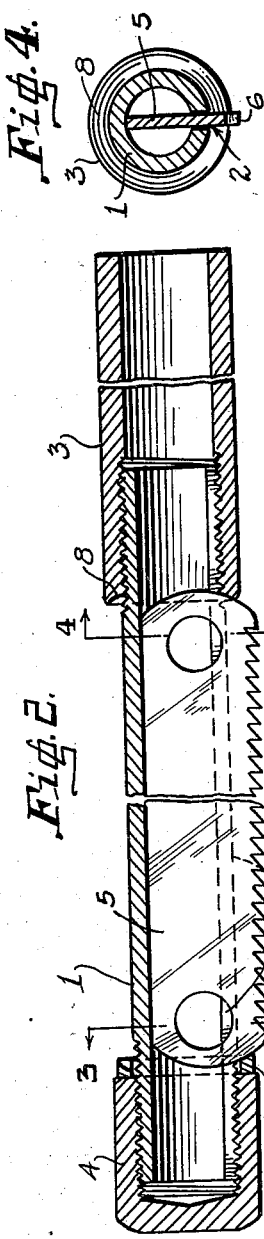
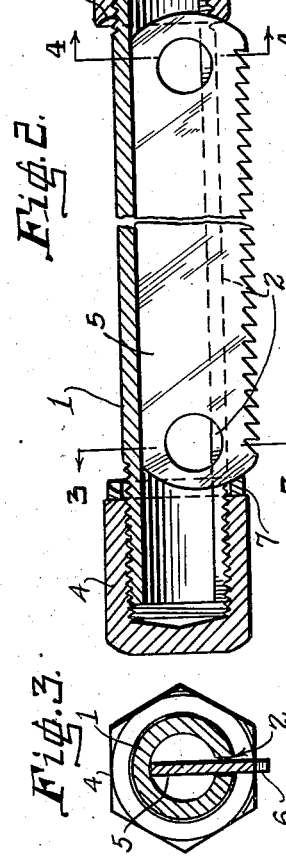
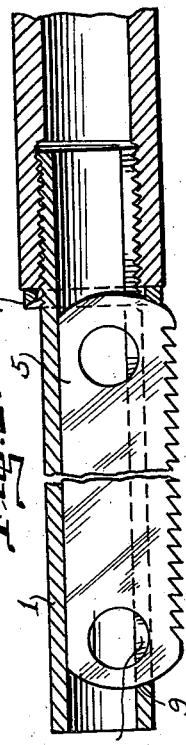
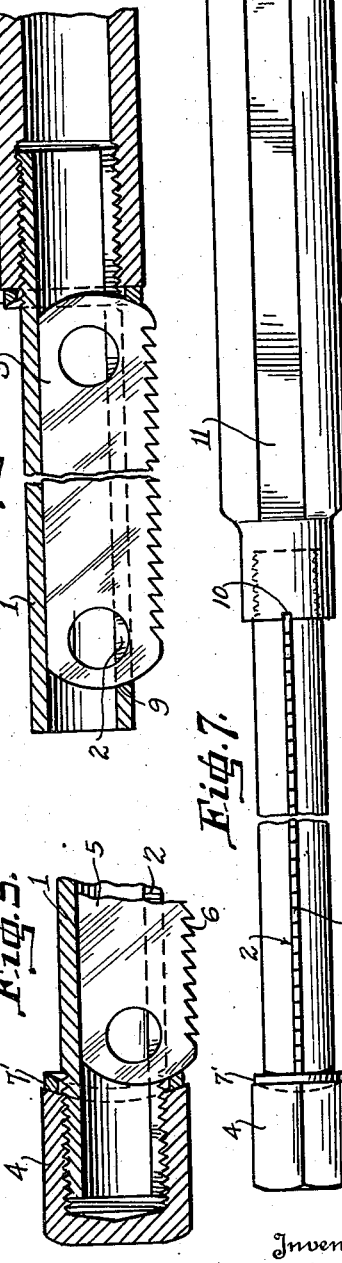
Inventor
C. W. Brackett
By Mason Fenwick & Lawrence
Attorneys Patented Oct. 21, 1930

1,778,996

UNITED STATES PATENT OFFICE

CHARLES W. BRACKETT, OF TAKOMA PARK, MARYLAND

SAW HOLDER

Application filed December 31, 1929. Serial No. 417,794.

This invention relates to saws of the type particularly adapted for cutting the metallic sheath of armored flexible electrical conductors, although its field of usefulness is by no means confined to this class of work.

One of the objects of the invention is the provision of a holder which will cooperate with the ordinary commercial form of hack saw blade to hold the same in position and to support it in such a manner as to prevent lateral bending of the blade, and to gage the depth of the cut whereby in the use of the blade only the armor and not the enclosed wires are severed.

Another object of the invention is to provide a hack saw blade holder for the purpose stated, the construction of which cooperates with the convex shape at the ends of the ordinary hack saw blade, to retain the blade in place, even though the blade be broken, as well as to ensure that it is supported against the rigid backing of the holder, which position of the blade determines the proper depth of the cut.

A further object of the invention is the construction of a hack saw blade holder of extreme simplicity having a gross adjustment by means of which its holding capacity may be varied to take blades of various lengths, and an additional adjustment for tightening the blade in the holder.

Other objects of the invention will appear as the following description of a preferred, and other embodiments thereof proceeds.

In the drawings in which the same characters of reference are used in the several figures to denote identical parts:

Figure 1 is a perspective view of the hack saw blade holder showing a blade in place;

Figure 2 is a longitudinal section through the holder shown in Figure 1, the intermediate portion being broken away;

Figure 3 is a cross section taken along the line 3—3 of Figure 2;

Figure 4 is a cross section taken along the line 4—4 of Figure 2;

Figure 5 is a slight modification in which the seating washer is of cupped form;

Figure 6 is a longitudinal section through a modified form of the invention, the intermediate portion being broken away, the entire adjustment in this instance being made from the handle end; and Figure 7 is an underneath view of another slightly modified form of the invention in which the handle and blade are interlocked, definitely allocating the handle with respect to the blade and preventing inadvertent rotation of the handle with respect to the blade when the device is in use.

Referring now in detail to the several figures, and first adverting to that form of the invention shown in Figures 1, 2, 3 and 4, the numeral 1 represents a body of the holder which is made from a section of pipe, threaded at both ends. The pipe is longitudinally slotted as shown at 2 in Figures 2, 3 and 4, a handle 3 being screwable upon one end while a nut 4 engages the threads at the other end.

Figures 3 and 4 show that the slot 2 is just wide enough to receive the saw blade, the latter being designated by the numeral 5, and that the diameter of the pipe of which the section 1 is made is selected with reference to the width of the saw blade so that a width portion 6 of the blade projects which is exactly the depth of the desired cut. The section 1 thus acts as a gage in determining that the saw blade shall be capable of cutting through the metallic sheath of the armored conductor without extending far enough to damage the enclosed wires.

The saw blade is normally retained by the handle 3 and nut 4, a washer 7 intervening between said nut and the adjacent end of the saw blade. This washer is an essential feature of the invention and its function in its relation to the present combination is entirely different from the ordinary function of washers.

It is to be noted from Figure 2 that the ends of the hack saw blade are convex, this being the shape of the ordinary hack saw blade of commerce, and that the peak of curvature of the end adjacent the washer extends within the zone of the washer, while an intermediate portion of said end seats against the washer. When the nut 4 is screwed snugly against the washer, and the latter, in turn, is brought into contact with the adjacent end of the saw blade, the latter is retained positively in place by virtue of the extended peak portion while, at the same time, the blade is tightly clamped in position.

The washer 7 is preferably formed of soft metal so that if in the act of tightening the nut 4, the friction between the nut and washer becomes greater than the friction between the washer and the small area of the saw blade with which it contacts the washer may rotate with the nut relative to the end of the saw blade.

In the absence of the washer 7, it would be impossible to properly tighten the saw blade in position, since, the saw blade being of highly tempered material, its first action upon being engaged by the nut will be to dig into the material of the nut so as to be non-rotatable with respect to the nut with the result that the latter can be turned no further even though the saw blade is not properly tightened.

The end of the handle 3 is preferably slightly concave as indicated at 8 to receive the opposite convex end of the saw blade, and it is unnecessary to use a washer at this point since the handle is not designed to be used in the tightening operation.

The handle does, however, provide an important adjustment. Saw blades by different manufacturers, or for that matter, by the same manufacturer, frequently differ in length by as much as a quarter of an inch or more. The threaded relation of the handle with reference to the section 1 permits the handle to be advanced or retracted relative to the slot by an amount sufficient to compensate for differences in the length of the saw blade, before any attempt is made to tighten the saw blade in the holder. When the proper length of slot has been provided, different adjustments of the washer and nut on the outer end of the saw blade are adjusted in the manner previously described, forcing the opposite end of the saw blade into the recess of the handle without producing any rotative effort between the saw blade and handle.

By virtue of the fact that the peak of curvature of the ends of the saw blade lie within the hollow of the annulus afforded by the washer on the one hand and by the recessed end of the handle on the other hand, the tightening of the saw blade also acts to force the saw blade backward until it lies firmly against the inside wall of the section 1 diametrically opposite to the slot. This avoids all chance of the saw blade being improperly seated and assures that the proper depth of cut shall be maintained at all times.

The feature of the slot being substantially no wider than the width of the saw blade, in combination with the seating and centering functions of the washer and recessed end of the handle also prevent the parts of the blade from falling out if the blade should snap at an intermediate point. Thus, this saw provides for the prolonged usefulness of the blade even if the latter has been broken.

Referring now to that form of the invention shown in Figure 5, it will be noted that the washer 7 is cupped shaped conforming more nearly to the curvature of the adjacent end of the saw blade. This enhances the security of the retention of the blade in the saw holder.

The modification of the invention shown in Figure 6 represents a simplified form of the device in which the nut 4 is dispensed with at the forward end of the saw holder, leaving the latter no larger in diameter than the pipe section itself. This permits the saw to be used through small openings not accessible to that form of the invention shown in Figure 1, in addition it simplifies the construction and the cost of the device.

In Figure 6, the forward end of the section 1 is left unthreaded, the slot 2 being terminated short of the end of the section, and the forward end wall of said slot being routed out or otherwise formed as shown at 9, so that it is oblique in the direction of the curvature of the contacting end of the saw blade. In this instance, the seating washer 7 is placed at the handle end, which position of the washer enables the construction of the handle 3 to be simplified, since it does not have to be recessed in the manner shown at 8 in Figure 1. In installing a blade in this holder, the handle is backed off together with the washer 7 until sufficient length of slot is provided to receive the blade. The handle is then screwed toward the blade forcing the washer into contact with the blade and in turn forcing the front end of the blade into contact with the end wall of the slot 9, the washer functions in this form of the invention in a manner exactly similar to that of the washer shown in Figure 2.

In Figure 7 is disclosed a form of the invention in which the saw blade coacts with the handle in such a manner as to prevent the handle rotating and so becoming loose and thereby loosening the blade in the operation of the device.

In this construction, the handle is provided with a notch 10 in the end adjacent the saw blade into which the end of the saw blade extends thus holding the parts together. For convenience in grasping the holder, the handle is preferably provided with a flat surface 11 on the same side with the notch 10. In inserting a saw in this form of holder, the nut and washer at the forward end are backed off a sufficient distance, the saw blade inserted in the slot, the handle rotated until it is retracted or advanced to correspond to variations in the length of the saw blade, and then turned until the notch 10 comes in line with the slot 2. The saw blade is then inserted with one end in the slot 10, whereupon the nut 4 is screwed so as to tighten the washer 7 against the opposite end of the saw blade.

While I have in the above description, disclosed what I have found to be simple and practical embodiments of the inventive principle, it is to be understood that the invention is not to be limited to these specific forms, but may be expressed in such other physical embodiments as may come within the scope of the appended claims.

What I claim is:

1. A holder for hack saw blades comprising a tubular section having a slot in one side for the insertion of a hack saw blade, said slot being of a width to prevent lateral deflection of said blade, said tubular section having a zone of screw threads at one end intersected by said slot, said tubular section being provided with means at the opposite end forming an abutment for said saw blade, and means screwing on the said threaded end, against said blade for tightening the latter relative to said holder.

2. A holder for hack saw blades comprising a tubular section having a slot in one side for the insertion of a hack saw blade, said slot being of a width to prevent lateral deflection of said blade, said tubular section having a zone of screw threads at one end intersected by said slot, said tubular section being provided with means at the opposite end forming an abutment for said saw blade, and means screwing on the said threaded end against said blade for tightening the latter relative to said holder, said means including a soft metal washer engageable directly with the end of said blade.

3. A holder for hack saw blades which have convex ends, comprising a tubular section having a slot in one side for the insertion of a hack saw blade having a curved end, said slot being of a width to prevent lateral deflection of said blade, said tubular section having a zone of screw threads at one end, which zone is intersected by said slot, said tubular section being provided with means at the opposite end forming an abutment for said saw blade, and means screwing on said threaded end for tightening said blade relative to said holder, said means including an apertured washer directly engageable with the curved end of said blade, the aperture of said washer being greater than one-half the width of said blade whereby the apex of curvature of said end extends into the aperture of said washer.

4. A holder for hack saw blades which have convex ends, comprising a tubular section having a slot in one side for the insertion of a hack saw blade having a curved end and of a width to prevent lateral deflection of said blade, said tubular section having a zone of screw threads at one end, said slot intersecting said zone, said tubular section being provided with means at the opposite end forming an abutment for said saw blade, and means screwing on said threaded end for tightening said blade relative to said holder, said means including an apertured washer of soft metal contacting directly with the curved end of said blade, the aperture of which washer is greater than one-half the width of the saw blade, whereby the peak of curvature of the convex end of said saw blade extends into said aperture.

5. A holder for hack saw blades which have convex ends, comprising a tubular section, the bore diameter of which is less than the width of said saw blade to determine a definite extension of the working side of said saw blade, and greater than one-half the width of said saw blade whereby the peak of curvature of said convex ends lies within said bore, said tubular section having a slot in which said saw blade is adapted to be inserted to a depth determined by the diameter of said bore, said slot being of a width to prevent lateral deflection of said saw blade, said tubular section having a zone of screw threads at one end intersected by said slot, and being provided with means at an opposite end forming an abutment for said saw blade on the side adjacent said slot, and means screwing on said threaded end for tightening said blade relative to said holder, said means including an apertured washer the aperture of which is greater than one-half the width of the saw blade, said washer being arranged to make direct contact with the adjacent end of said blade.

6. A holder for hack saw blades which have convex ends, comprising a tubular section, the bore diameter of which is less than the width of said saw blade to determine a definite extension of the working side of said saw blade, and greater than one-half the width of said saw blade whereby the peak of curvature of said convex ends lies within said bore, said tubular section having a slot in which said saw blade is adapted to be inserted to a depth determined by the diameter of said bore, said slot being of a width to prevent lateral deflection of said saw blade, said tubular section having zones of screw threads at its opposite ends intersected by said slot, a handle screwed on one end and a nut screwing on the other end, and a washer of soft metal on said tubular section adjacent one of said screwing members arranged to make direct contact with the adjacent end of said saw blade.

7. A holder for hack saw blades which have convex ends, comprising a tubular section, the bore diameter of which is less than the width of said saw blade to determine a definite extension of the working side of said saw blade, and greater than one-half of the width of said saw blade whereby the peak of curvature of said convex ends lies within said bore, said tubular section having a slot in which said saw blade is adapted to be inserted to a depth determined by the diameter of said bore, said slot being of a width to prevent lateral deflection of said saw blade, said tubular section having zones of screw-threads at each end intersected by said slot, a handle screwing on one end having a notch in its end face adapted to register with said slot and to receive the end of said saw blade, an adjusting nut screwing on the opposite end of said tubular section, and a washer of soft metal on said tubular section adjacent said nut adapted to direct contact with the adjacent end of said blade when said nut is tightened, said handle having a flat surface on the same side as said notch.

8. A holder for hack saw blades which have convex ends, comprising a tubular section, the bore diameter of which is less than the width of said saw blade to determine a definite extension of the working side of said saw blade, and greater than one-half the width of said saw blade whereby the peak of curvature of said convex ends lies within said bore, said tubular section having a slot in which said saw blade is adapted to be inserted to a depth determined by the diameter of said bore, said slot being of a width to prevent lateral deflection of said saw blade, said tubular section having a zone of screw threads at one end intersected by said slot, and being provided with means at an opposite end forming an abutment for said saw blade on the side adjacent said slot, and means screwing on said threaded end for tightening said blade relative to said holder, said means including an apertured cup shaped washer, the aperture of which is greater than one-half the width of the saw blade, said washer being arranged to make direct contact with the adjacent end of said blade.

In testimony whereof I affix my signature.

CHARLES W. BRACKETT.